Figure 1:
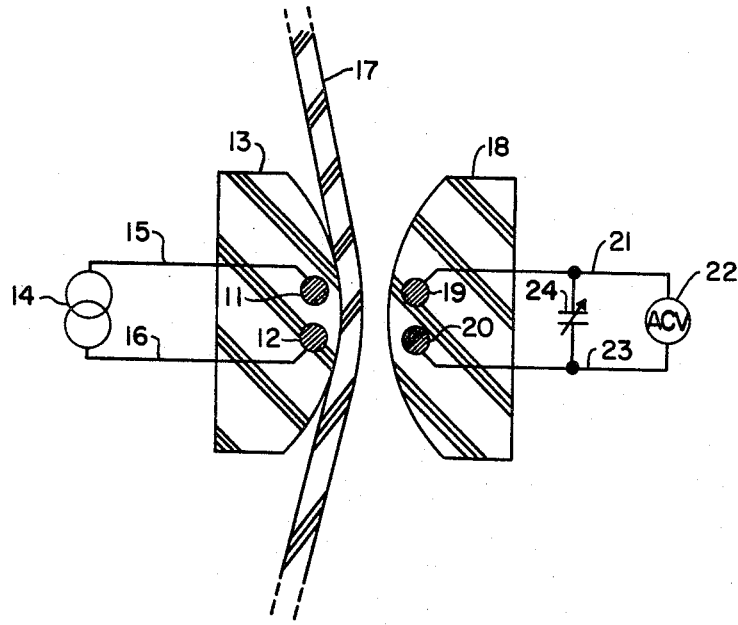

Aug. 8, 1967     T. D. LODE     3,335,364
DIELECTRIC MEASUREMENT OF THIN MATERIALS INCLUDING MEANS
FOR GENERATING AND MEASURING AN ELECTRIC FIELD
IN THE PLANE OF SAID MATERIAL
Filed Sept. 17, 1965

INVENTOR
TENNY D. LODE

United States Patent Office 3,335,364
Patented Aug. 8, 1967

3,335,364
DIELECTRIC MEASUREMENT OF THIN MATERIALS INCLUDING MEANS FOR GENERATING AND MEASURING AN ELECTRIC FIELD IN THE PLANE OF SAID MATERIAL
Tenny D. Lode, Madison, Wis., assignor to Rosemount Engineering Company, Minneapolis, Minn., a corporation of Minnesota
Filed Sept. 17, 1965, Ser. No. 488,132
4 Claims. (Cl. 324—61)

This invention relates to the measurement of the dielectric properties of materials. More particularly, it relates to dielectric measurments of thin sheets of material and the determination of various properties which may be inferred from dielectric measurements.

In many paper manufacturing processes, the paper is formed in continuous moving sheets from mixtures of fibers, water and various chemicals. These newly formed wet sheets of paper must be properly dried before going through the final manufacturing stages. Hence, it is desirable to be able to measure the water content of moving continuous sheets of paper. The relatively high dielectric constant of water suggests that dielectric measurements might be used for determining the water content of a moving paper sheet. However, simply placing a capacitor plate on each side of the paper sheet and measuring the capacitance between the two plates does not provide a very direct measure of the water content. Regardless of whether the capacitor plates are held at a fixed spacing or allowed to ride in contact with the surface of the paper sheet, the electrical capacitance between the plates will vary greatly with the thickness of the paper sheet as well as with its dielectric constant.

An object of this invention is to allow the dielectric measurement of the properties of relatively thin sheets of material in a manner which is less dependent upon their thickness. Other objects and advantages may be seen by reference to the drawings and to the following specification and the claims.

In a particular form of this invention, a sheet whose dielectric properties are to be measured is placed in close proximity to a pair of electrodes on one side of said sheet. The electrodes are excited with alternating voltage. The geometry of the electrodes is such as to induce an alternating electric field component generally parallel to a surface of the sheet. A closely spaced second pair of electrodes is placed on the second side of the sheet and the alternating current or voltage induced on said electrodes is measured. The relative magnitude of this alternating voltage will be a measure of dielectric properties of the thin sheet.

Figure 2:
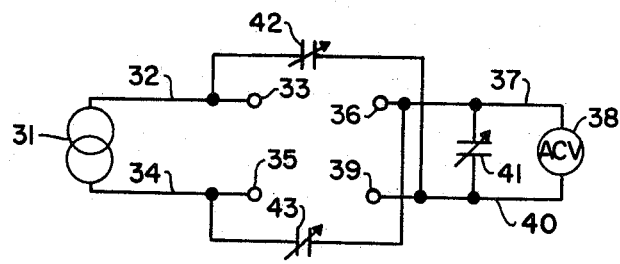

In the drawings:

FIGURE 1 is a section view and schematic illustration of a first form of the invention; and FIGURE 2 is a schematic illustration of a second electrical circuit which may be used with the form of the invention shown in FIGURE 1.

Referring now to the drawings, FIGURE 1 includes wire electrodes 11 and 12 within insulator block 13. Alternating voltage source 14 connects via lines 15 and 16 to electrodes 11 and 12, respectively. Dielectric sheet 17 passes over the face of block 13. Dielectric block 18 contains wire electrodes 19 and 20. Electrode 19 connects via line 21 to a first side of A.C. voltmeter 22. Electrode 20 connects via line 23 to the second side of A.C. voltmeter 22. Variable capacitor 24 is connected across lines 21 and 23.

In operation, an alternating electric field is generated by the alternating voltage excitation of electrodes 11 and 12. This field will extend to block 18 and beyond where it will induce a voltage across electrodes 19 and 20 which may be measured by voltmeter 22. If sheet 17 contains a material whose dielectric constant is greater than one, it will have a shunting effect upon the field passing from block 13 to block 18 and will reduce the magnitude of the voltage induced between electrodes 19 and 20. Hence, the magnitude of the voltage measured by voltmeter 22 will be a measure of the dielectric properties of sheet 17. Variable capacitor 24 serves as a calibration adjustment to adjust the circuit for the desired sensitivity. A particular advantage of the system of FIGURE 1 is that it is less sensitive to variations in the thickness of sheet 17 than systems which measure capacitance between electrodes on opposite sides of the sheet.

The system of FIGURE 1 may be viewed as a form of four-terminal capacitance measurement system. That is, a voltage is applied across electrodes 11 and 12, and an induced voltage or current is measured across two other electrodes, 19 and 20. A significant portion of the generated electric field is generally parallel to the surface of sheet 17. This distinguishes the system of FIGURE 1 from systems which measure capacitance between electrodes on opposite sides of a sheet and which induce electric fields which are largely perpendicular to the surface of the measured sheet.

Reference is now made to FIGURE 2 which is a schematic illustration of a second electrical circuit which may be used with the form of the invention shown in FIGURE 1. In FIGURE 2, alternating voltage source 31 connects via line 32 to terminal 33, and via line 34 to terminal 35. Terminal 36 connects via line 37 to a first side of A.C. voltmeter 38, and terminal 39 connects via line 40 to the second side of voltmeter 38. Variable capacitor 41 is connected across lines 37 and 40. Variable capacitor 42 is connected across lines 32 and 40, and variable capacitor 43 is connected across lines 34 and 37.

The circuit of FIGURE 2 may be used to replace voltage source 14, voltmeter 22 and capacitor 24 of FIGURE 1. In use, terminals 33, 35, 36 and 39 would connect to electrodes 11, 12, 19 and 20, respectively. As may be seen, the circuit of FIGURE 2 differs from the circuit shown in FIGURE 1 by the addition of capacitors 42 and 43. In operation, capacitors 42 and 43 may be adjusted so that the voltage measured by voltmeter 38 is essentially zero for some particular condition. This null voltage condition may be no film between blocks 13 and 18, a standard film between blocks 13 and 18, or such other reference condition as may be desired. An advantage of the circuit of FIGURE 2 is that it allows deviations from a standard or reference condition to be measured more easily and with greater precision.

If desired, voltmeter 38 may be a phase-sensitive voltmeter comparing the amplitude and/or phase of the voltage across lines 37 and 40 with the amplitude and/or phase of the voltage generated by source 31. This will provide a convenient indication of the direction of an off null condition as well as the magnitude thereof.

The drawings have shown systems in which electrode pairs are placed on opposite sides of a sheet of material to be measured. An electric field component parallel to the surfaces of the sheet is generated on one side and sensed on the other. In some instances, it may be desirable to construct systems with the field generating and sensing means not separated by the material being measured. For example, blocks 13 and 18 of FIGURE 1 may be placed on the same side of sheet 17. The various electrodes may be arranged within a single block, or otherwise as desired.

The systems of FIGURES 1 and 2 are shown as electrically floating. That is, the field generating and sensing circuits are not connected to reference or common potential points. In some instances, it may be desirable to connect the field generating and/or sensing circuits to one or more reference or common potential points. For example, alternating voltage source 14 of FIGURE 1 may be provided with a center tap which is connected to a ground point.

What is claimed is:

1. Means for measuring the dielectric shunting properties of a sheet of material including a first pair of electrodes on a first side of said sheet, said first pair of electrodes being arranged to give a substantial electric field component parallel to a surface of said sheet, a second pair of electrodes on a second and opposite side of said sheet, said second pair of electrodes being arranged to be responsive to said electric field component, a source of alternating voltage, means connecting said source to said first pair of electrodes, means responsive to an alternating voltage, means connecting said second pair of electrodes to said responsive means and a pair of adjustment capacitors, each of said adjustment capacitors connecting from a separate one of said first pair of electrodes to a separate one of said second pair of electrodes.

2. Means for measuring the dielectric shunting properties of a sheet of material comprising first and second input electrodes positioned adjacent a first side of said sheet, a source of alternating voltage connected to said input electrodes to generate an electric field therebetween, said input electrodes being positioned so that a substantial portion of said electric field is generated in the plane of the sheet, first and second signal electrodes positioned adjacent a second and opposite side of said sheet to be responsive to said electric field, said signal electrodes being positioned to have a signal voltage between said signal electrodes which is substantially dependent upon said electric field generated in the plane of the sheet, and means to measure said signal voltage occurring at said signal electrodes.

3. The combination of claim 2, wherein said first and second input electrodes are spaced apart a distance less than the distance separating said input electrodes from said signal electrodes and are each spaced at a substantially equal distance from said first side of sheet.

4. The combination of claim 2 wherein said first and second input electrodes are mounted within an electrical insulator block which is adapted to contact said first side of said sheet, said input electrodes being spaced substantially equidistant from said sheet and being spaced closer to said sheet than their separation from each other, and said signal electrodes being spaced substantially equidistant from said sheet and being spaced farther from said sheet than their separation from each other.

References Cited

UNITED STATES PATENTS

| 1,708,073 | 4/1929 | Allen | 324—61 |
| 1,984,166 | 12/1934 | Walter | 324—61 X |
| 2,631,188 | 3/1953 | Clapp. | |
| 2,766,421 | 10/1956 | Wait et al. | 324—61 X |
| 2,885,633 | 5/1959 | Cook | 324—61 X |

RUDOLPH V. ROLINEC, *Primary Examiner.*

WALTER L. CARLSON, *Examiner.*

E. E. KUBASIEWICZ, *Assistant Examiner.*